United States Patent [19]

Ota et al.

[11] Patent Number: 5,322,237
[45] Date of Patent: Jun. 21, 1994

[54] LID ASSEMBLY FOR A TAPE CASSETTE WHICH PROTECTS FRONT AND REAR SURFACES OF A MAGNETIC TAPE

[75] Inventors: Shuichi Ota; Yoichirou Senshu, both of Kanagawa; Akihiro Uetake, Tokyo; Shinichi Hasegawa, Chiba; Takashi Sawada; Chiaki Sugai, both of Kanagawa, all of Japan

[73] Assignee: Sony Corporation, Tokyo, Japan

[21] Appl. No.: 930,350

[22] Filed: Aug. 17, 1992

[30] Foreign Application Priority Data

Aug. 27, 1991 [JP] Japan .................................. 3-238975

[51] Int. Cl.$^5$ ............................................ G11B 23/04
[52] U.S. Cl. ...................................... 242/199; 242/198
[58] Field of Search ................... 242/198, 192; 360/132

[56] References Cited

U.S. PATENT DOCUMENTS

| | | | |
|---|---|---|---|
| 4,589,609 | 5/1986 | Oishi et al. | 242/198 |
| 4,701,822 | 10/1987 | Oishi et al. | 242/198 X |
| 4,844,377 | 7/1989 | Shiomi et al. | 242/199 X |
| 4,897,751 | 1/1990 | Goto | 360/132 |
| 5,170,962 | 12/1993 | Iwahashi et al. | 242/199 |

Primary Examiner—Daniel P. Stodola
Assistant Examiner—Eileen A. Dunn
Attorney, Agent, or Firm—William S. Frommer; Alvin Sinderbrand

[57] ABSTRACT

A tape cassette comprises a case body having a mouth formed in the front portion thereof, a front lid pivotally supported thereon so as to cover the open front side of the case body, and a back lid pivotally joined to the front lid so as to cover a space extending behind the substantially lower half of an exposed portion of a magnetic tape in the mouth. The front lid includes a front wall covering the front opening of the mouth, side walls extending backward from the opposite side edges of the front wall, an upper wall covering the upper opening of the mouth, and a back wall extending downward from the upper wall. The side wall is provided with two guide grooves with two round projections projecting from the inner surface of the side wall being respectively received therein. Each of the two guide grooves has the shape of an arc of a circle having its center at the center of an imaginary circle at one end of the other guide groove. When the front lid is turned toward its opening position, one of the round projections moves first along the corresponding guide groove at the initial stage of turning of the front lid, and then the other round projection moves along the corresponding guide groove at the final stage of turning of the front lid.

10 Claims, 12 Drawing Sheets

FIG. I

F I G. 5
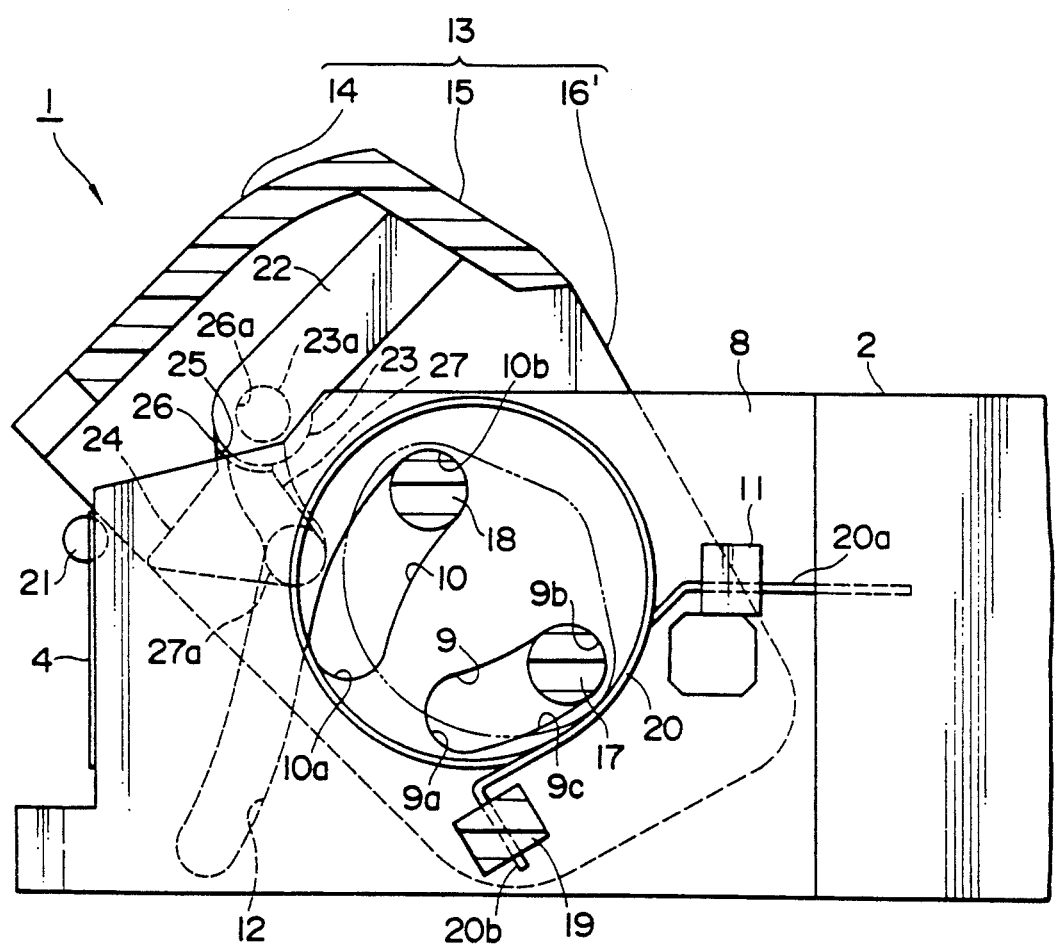

LID ASSEMBLY FOR A TAPE CASSETTE WHICH PROTECTS FRONT AND REAR SURFACES OF A MAGNETIC TAPE

BACKGROUND OF THE INVENTION

1. Field of the Invention

The present invention relates to a novel tape cassette and, more specifically, to a tape cassette having a front lid covering a space extending in front of the magnetic tape contained therein and a back lid covering a space extending behind the magnetic tape.

2. Description of the Prior Art

Importance of protecting a magnetic tape from dusting has increased with the augmentation of recording density. Some tape cassette is provided with a front lid and a back lid for covering spaces extending in front of and behind, respectively, of the magnetic tape contained therein so that the magnetic tape will not be exposed while the magnetic tape is not in use. Such a tape cassette a is shown in FIGS. 1 to 12. This tape cassette a has a case body b resembling a box having a laterally elongate, rectangular shape in plan view. Two tape reels, not shown, are supported for rotation within the case body b. A magnetic tape c having opposite ends fastened respectively to the tape reels extends along the front surface of the case body b between tape outlets, not shown, formed in the front wall of the case body b. The case body b is provided with a mouth d having an upper opening and a front opening and formed in front of the front wall thereof between the two tape outlets.

A front lid e for covering the a space extending in front of the case body b is supported pivotally on the case body b. The front lid e has a front wall f facing the front wall of the case body b, an upper wall g extending backward from the upper edge of the front wall f, side walls h (only one of them is shown) extending backward from the opposite side edges of the front wall f, and trunnions i (only one of them is shown) projecting from the side walls h and rotatably supported in holes formed in the respective front portions of the side walls of the case body b. The front lid e is rotatively biased by a spring, not shown, toward a closing position, where the front wall f of the front lid e is positioned in front of a portion of the magnetic tape c extending along the front surface of the front wall of the case body b. Support legs j (only one of them is shown) project downward from the upper wall g of the front lid e at positions at a small distance from the opposite side ends of the upper wall g and corresponding to the opposite ends of the mouth d.

A back lid k is positioned in the mouth d so as to cover the back surface of the magnetic tape c. Pivots 1 (only one of them is shown) projecting from the substantially central portions of the opposite side walls of the back lid k are supported pivotally on the lower ends of the support legs j, respectively, of the front lid e. The back lid k has side walls provided at their lower ends with projections m (only one of them is shown). The projections m are fitted in guide grooves n (only one of them is shown) formed in side walls defining the opposite ends of the mouth d of the case body b, respectively. The back lid k has an upper wall o which extends horizontally when the back lid k is at the closing position.

In FIG. 10, the front lid e and the back lid k are at their closing positions, where the front wall f of the front lid e is positioned in front of the exposed portion of the magnetic tape c and the back lid k is behind the exposed portion of the magnetic tape c in the mouth d. In this state, the front half of the upper opening of the mouth d is covered with the upper wall g of the front lid e and the back half of the same is covered with the upper wall o of the back lid k. If the upper wall g of the front lid e is formed so as to cover the upper opening of the mouth d entirely, the height of the front lid e from the upper surface of the case body b when the front lid e is fully opened needs to be greater than that of the same having the upper wall g covering the front half of the upper opening of the mouth d, because the front lid e is turned about an axis and the front lid e must be positioned over the back lid k when the front lid e and the back lid k are fully opened. When the front lid e and the back lid k are fully opened, the upper wall o of the back lid k is positioned behind the upper wall g of the front lid e.

As a cassette holder holding the tape cassette a is lowered in the cassette loading unit of a video tape recorder, the lid opener p of the video tape recorder engages the lower edge of one of the side walls h of the front lid e as shown in FIG. 10. As the cassette holder is lowered further, the lid opener p pushes the front lid e to turn the front lid e on its trunnions i toward the opening position against the force of the spring biasing the front lid e toward the closing position as shown in FIG. 11. Finally, the front lid e is turned to the opening position as shown in FIG. 12. Meanwhile, the pivots 1 of the back lid k engaging the support legs j of the front lid e move upward together with the front lid e and the projections m of the back lid k move along the guide grooves n, turning the back lid k on the pivots 1 as the front lid e is turned on its trunnions i. The front lid e and the back lid k reach their opening positions simultaneously.

The front lid e of this tape cassette a has a relatively low rigidity and is liable to flex when pressure is applied to the middle portion thereof, because the front lid e consists of only the front wall f, the upper wall g and the side walls h. If the front lid e flexes, a gap is formed between the front lid e and the back lid k. Then, dust enters the tape cassette a and makes the magnetic tape c dusty or the magnetic tape c may possibly be damaged with fingers. Even if the magnetic tape c is not damaged accidentally or not made dusty, the user will worry about damaging the magnetic tape c and the reliability of the tape cassette a will be spoiled if a gap is formed between the front lid e and the back lid k.

SUMMARY OF THE INVENTION

Accordingly, it is an object of the present invention to provide a tape cassette provided with a front lid having a relatively high rigidity, for covering the front surface of the magnetic tape contained therein, and a back lid for covering the back surface of the magnetic tape, requiring a relatively narrow space for turning the front lid and the back lid in opening the front lid and the back lid, having good appearance and capable of facilitating handling.

In one aspect of the present invention, a tape cassette comprises: a case body; a front lid pivotally supported on the case body so as to cover a space extending in front of a portion of a magnetic tape contained in the case body, exposed in a mouth formed in the front portion of the case body; and a back lid pivotally supported on the front lid so as to cover a space extending behind the substantially lower half of the back surface of the exposed portion of the magnetic tape in the mouth; wherein the front lid has a front wall covering the front opening of the mouth, side walls extending backward respectively from the opposite side edges of the front wall, an upper wall covering the upper opening of the mouth, and a back wall extending downward from the upper wall so as to cover a space behind the substantially upper half of the back surface of the magnetic tape in the mouth, the lower edge of the back wall of the front lid is substantially in contact with the upper edge of the back lid when the front lid is at the closing position, each side wall of the front lid is provided with two round projections received respectively in two guide grooves formed in the side wall of the case body, one of the two guide grooves has the shape of an arc of a circle having its center at one end of the other guide groove and the other guide groove has the shape of an arc of a circle having its center at one end of the former guide groove, and the two round projections move alternately along the two guide grooves, respectively when the front lid is turned between the closing position and the opening position.

When the front lid is turned toward the opening position, one of the two round projections projecting from each side wall of the front lid moves first along the corresponding guide groove formed in the side wall of the case body and then the other round projection moves along the corresponding guide groove. Therefore, the height of the front lid from the upper surface of the case body when the front lid is at the opening position is relatively small. Therefore, the upper wall of the front lid may be formed so as to cover the upper opening of the mouth entirely and the back lid need not be provided with any upper wall. The back lid covers substantially only the space behind the lower half of the back surface of the magnetic tape. The front lid is formed substantially in the shape of a channel bar so that the front lid has a sufficiently high rigidity and the front lid is not flexed easily when an external force acts thereon. Thus, the tape cassette has an improved reliability.

BRIEF DESCRIPTION OF THE DRAWINGS

The above and other objects, features and advantages of the present invention will become more apparent from the following description taken in connection with the accompanying drawings, in which:

FIG. 5 is a sectional view of the tape cassette of FIG. 1 in a state where the tape cassette is half open;

DETAILED DESCRIPTION OF THE PREFERRED EMBODIMENTS

A tape cassette in a preferred embodiment according to the present invention as applied to containing 8 mm video tape will be described hereinafter.

Figure 1:
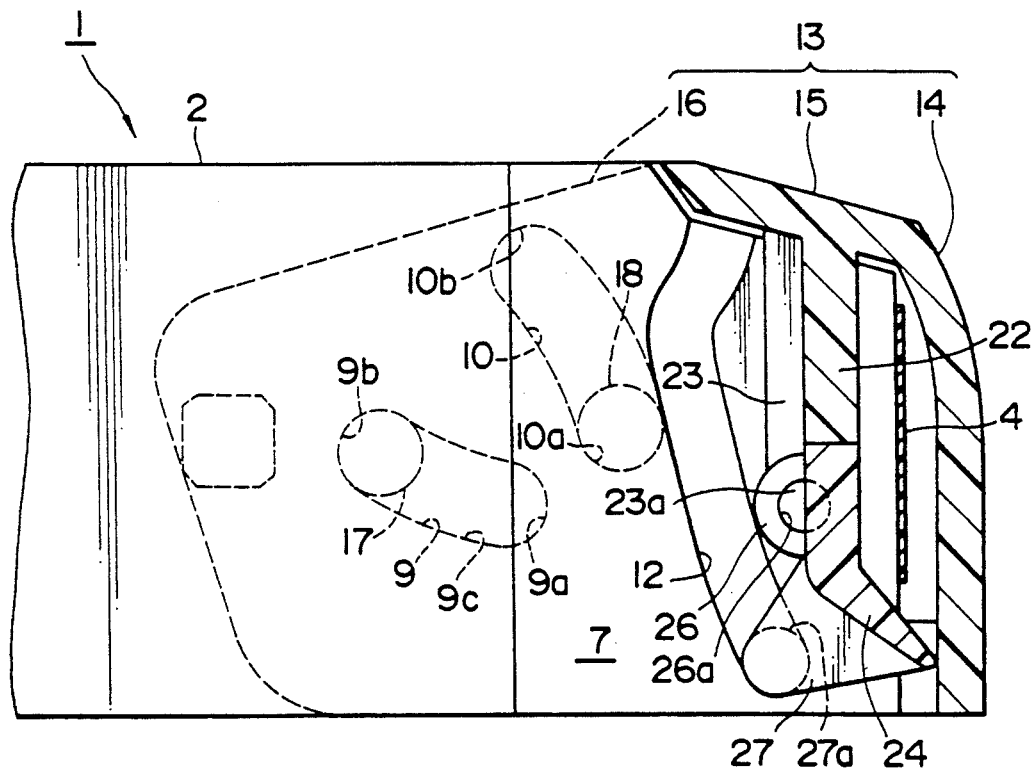
FIG. 1 is a fragmentary sectional view of a tape cassette in a preferred embodiment according to the present invention.
Figure 2:
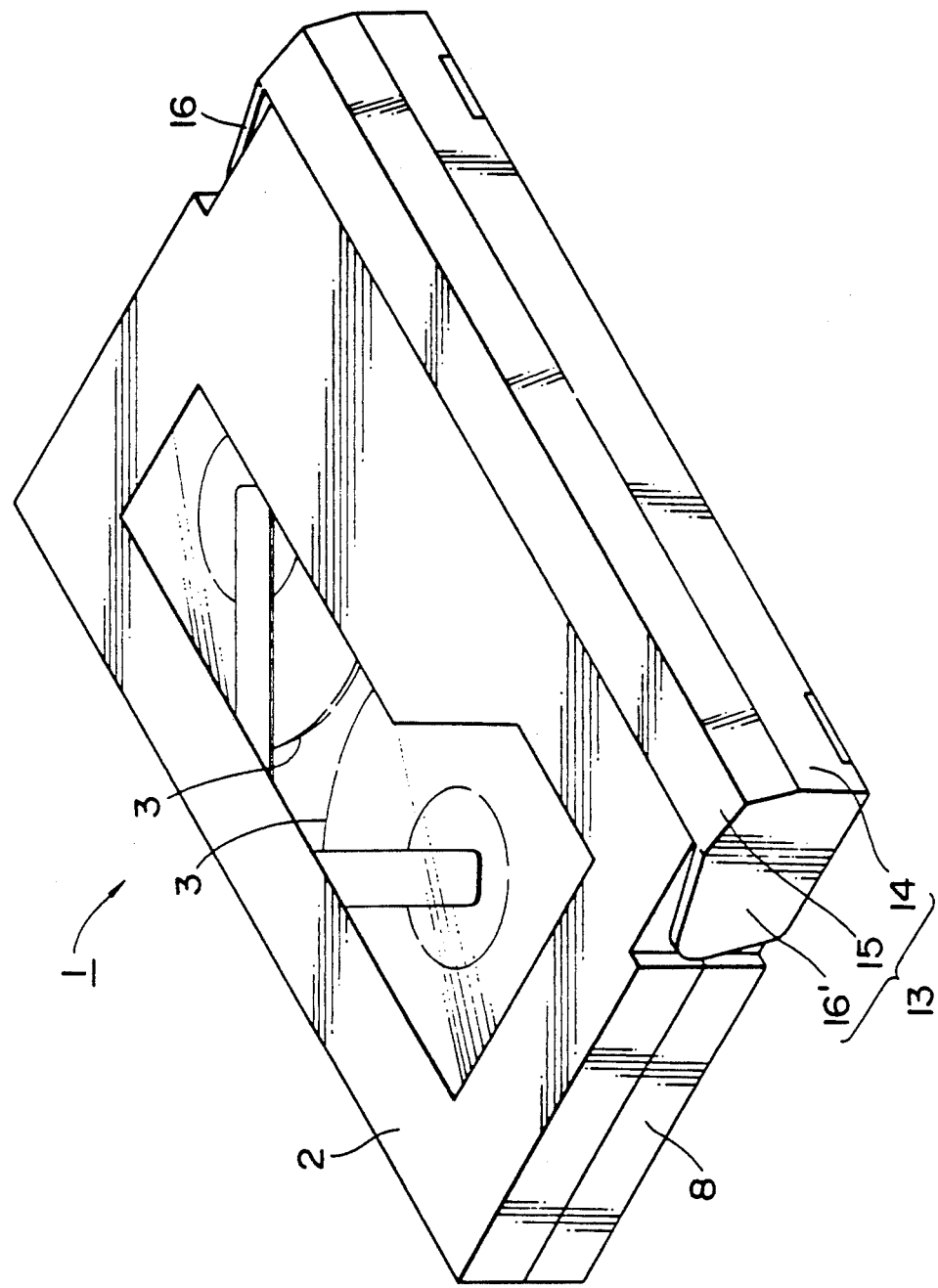
FIG. 2 is a perspective view of the tape cassette of FIG. 1.
Figure 3:
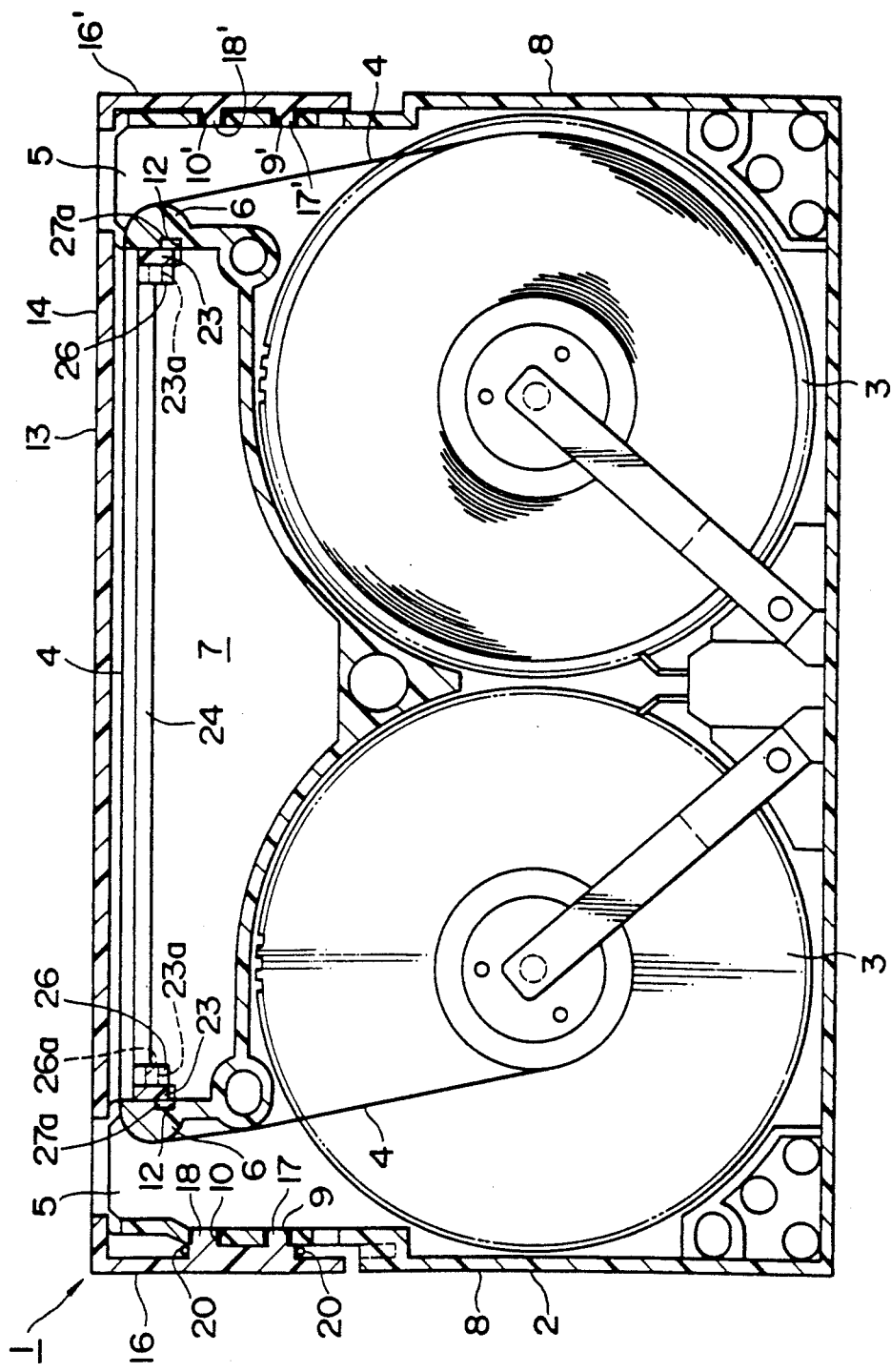
FIG. 3 is a sectional plan view of the tape cassette of FIG. 1.

Referring to FIGS. 1 to 3, a tape cassette 1 has a case body 2 having the shape of a laterally rectangular, flat box, two tape reels 3 are supported for rotation in the case body 2, and a magnetic tape 4 fastened at its opposite ends to the tape reels 3 is wound around and extended between the tape reels 3. Tape outlets 5 are formed in the front wall of the case body 2 respectively at positions near the opposite ends of the case body, and inner guides 6 are formed respectively at the inner ends of the tape outlets 5. A portion of the magnetic tape 4 extends around the inner guides 6 and along the front surface of the case body 2 between the tape outlets 5. A mouth 7 is formed between the tape outlets 5 in the front portion of the case body 2. The mouth 7 is open on the upper, lower and front sides.

A lower guide groove 9 and an upper guide groove 10 each having the shape of a circular arc are formed in the front portion of one of the side walls 8 of the case body 2, and a lower guide groove 9' and an upper guide groove 10' each having the shape of a circular arc are formed in the the front portion of the other side wall 8 of the case body 2. The lower guide grooves 9 and 9' ascend backward, and the upper guide grooves 10 and 10' ascend substantially vertically and the back portions of the same extends slightly obliquely backward. The front portions 9a and 9'a of the lower guide grooves 9 and 9' are positioned substantially under the rear portions 10b and 10'b of the upper guide grooves 10 and 10', respectively, and the rear portions 9b and 9b' of the lower guide grooves 9 and 9' are positioned substantially directly behind the front portions 10a and 10'a of the guide grooves 10 and 10', respectively. The upper guide groove 10 (10') has the shape of an arc of a circle having its center at the center of an imaginary circle in the rear end 9b (9'b) of the lower guide groove 9 (9'), and the lower guide groove 9 (9') has the shape of an arc of a circle having its center at the center of an imaginary circle in the rear end 10b (10'b) of the upper guide groove 10 (10').

Figure 7:
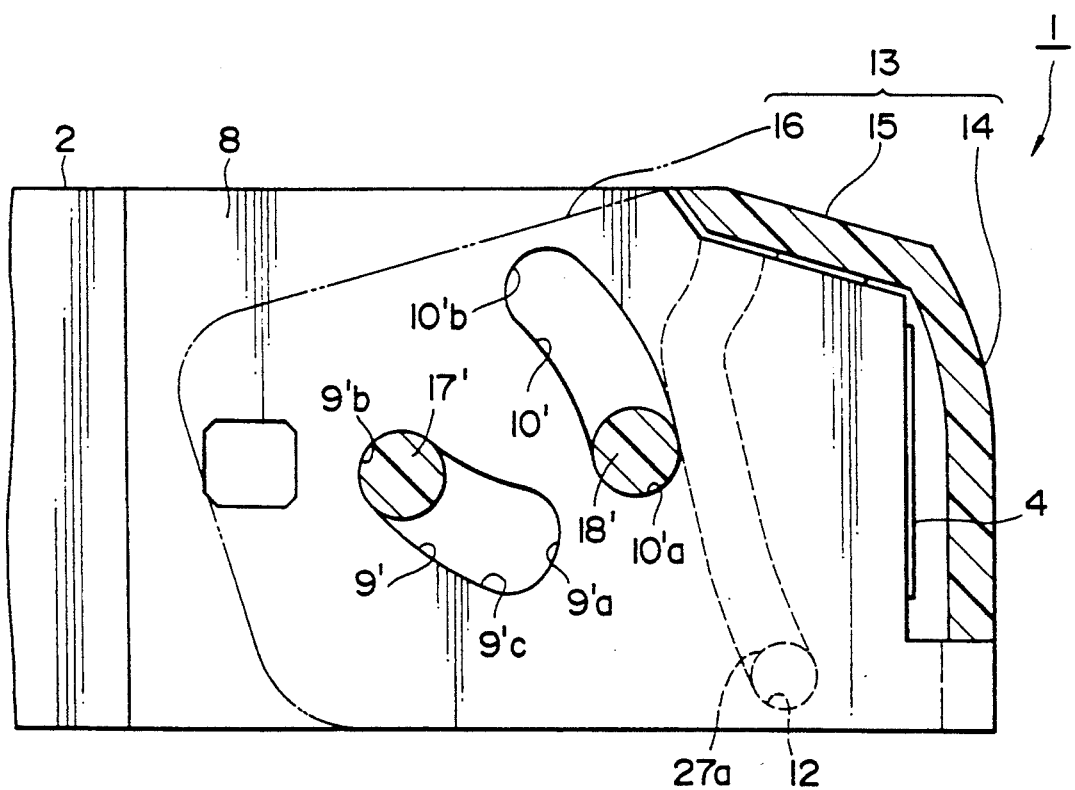
FIG. 7 is an enlarged sectional view of assistance in explaining the shape and arrangement of guide grooves.

As shown in FIG. 7, the front portion of the lower edge 9'c of the lower guide groove 9' deviates downward from the circular arc corresponding to the lower edge 9c of the other lower guide groove 9 so that the lower guide groove 9' expands gradually toward the front end 9'a.

A spring peg 11 is formed on the inner surface of the side wall of the case body 2 at a position slightly behind the rear end 9b of the lower guide groove 9. Guide grooves 12 slightly tilted backward and slightly bent to the front are formed in side walls defining the opposite ends of the mouth 7. The upper end of each guide groove 12 is positioned slightly behind a vertical line passing the lower end of the guide groove 12.

A front lid 13 has a front wall 14 capable of entirely covering the front opening of the case body 2, an upper wall 15 extending backward from the upper edge of the front wall 14 and capable of covering the upper opening of the mouth 7, and side walls 16 and 16' extending backward from the opposite side edges of the front wall 14 and merging into the the side edges of the upper wall 15. The front wall 14, the upper wall 15 and the side walls 16 and 16' are formed integrally in a single member. Two round projections 17 and 18 (17' and 18') are formed on the inner surface of the side wall 16 (16'). The center distance between the round projections 17 and 18 (17' and 18') is equal to the radii of curvature of the guide grooves 9 and 10 (9' and 10'); that is, the center distance between the round projections 17 and 18 (17' and 18') is equal to the center distance between an imaginary circle in the rear end 9b (9'b) of the lower guide groove 9 (9') and an imaginary circle in the rear end 10b (10'b) of the upper guide groove 10 (10'). A spring peg 19 is formed on the inner surface of the side wall 16 at a position below and slightly behind the round projection 17.

The round projections 17 and 17' are received respectively in the lower guide grooves 9 and 9' for sliding, and the round projections 18 and 18' are received respectively in the upper guide grooves 10 and 10' for sliding so that the front lid 13 is supported for turning on the front end of the case body 2.

Figure 4:
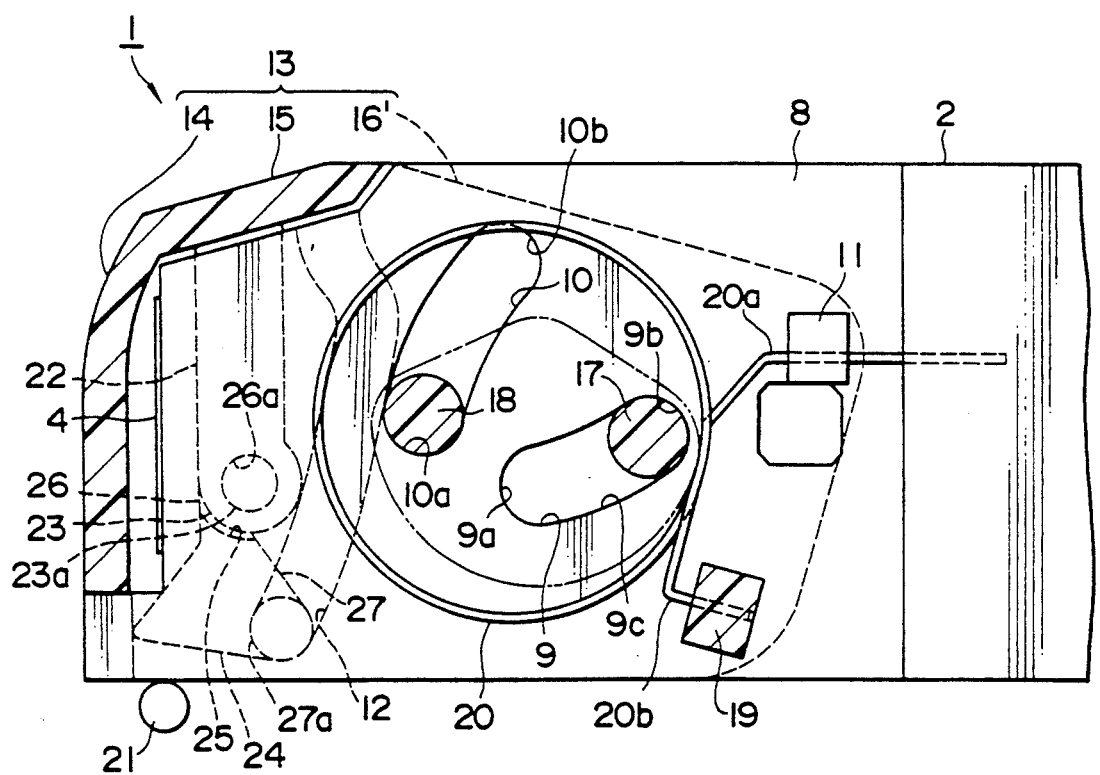
FIG. 4 is a sectional view of the tape cassette of FIG. 1 in a state where the tape cassette is fully closed.
Figure 9:
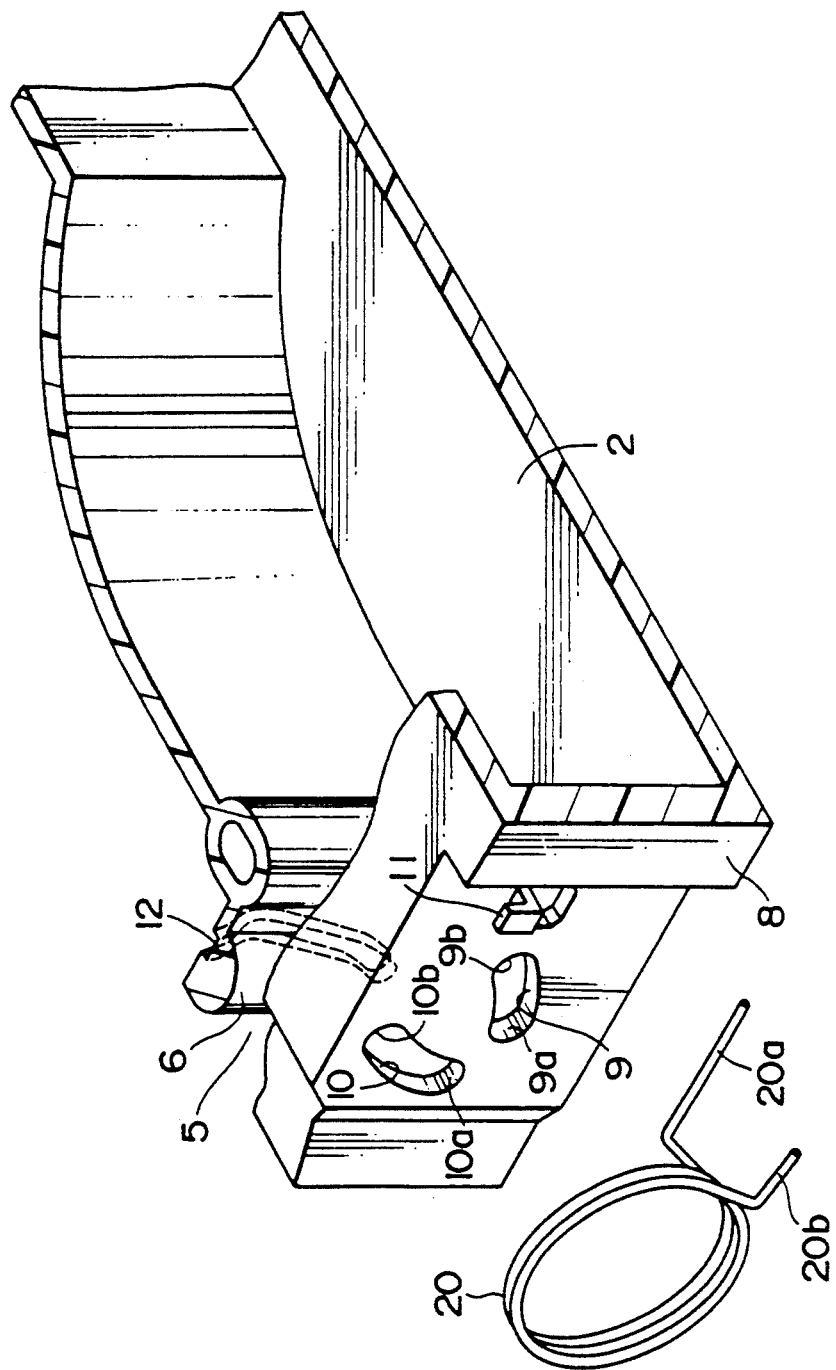
FIG. 9 is an enlarged perspective view of a portion of a case body provided with guide grooves.
Figure 10:
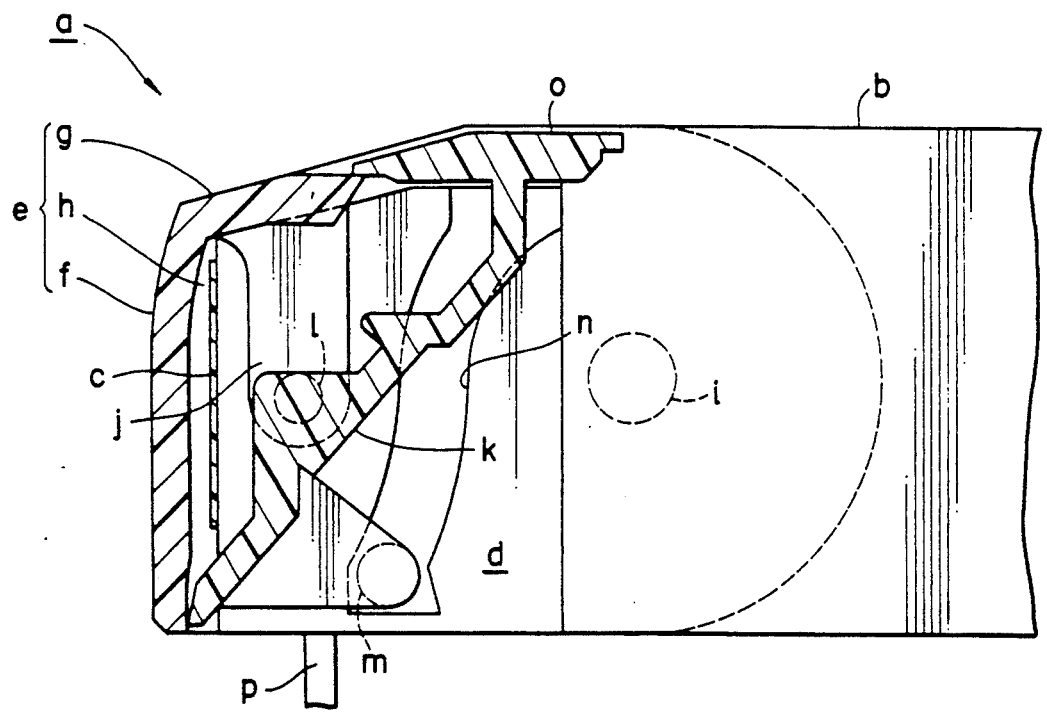
FIG. 10 is a fragmentary sectional view of a prior art tape cassette in a state where the tape cassette is fully closed.
Figure 11:
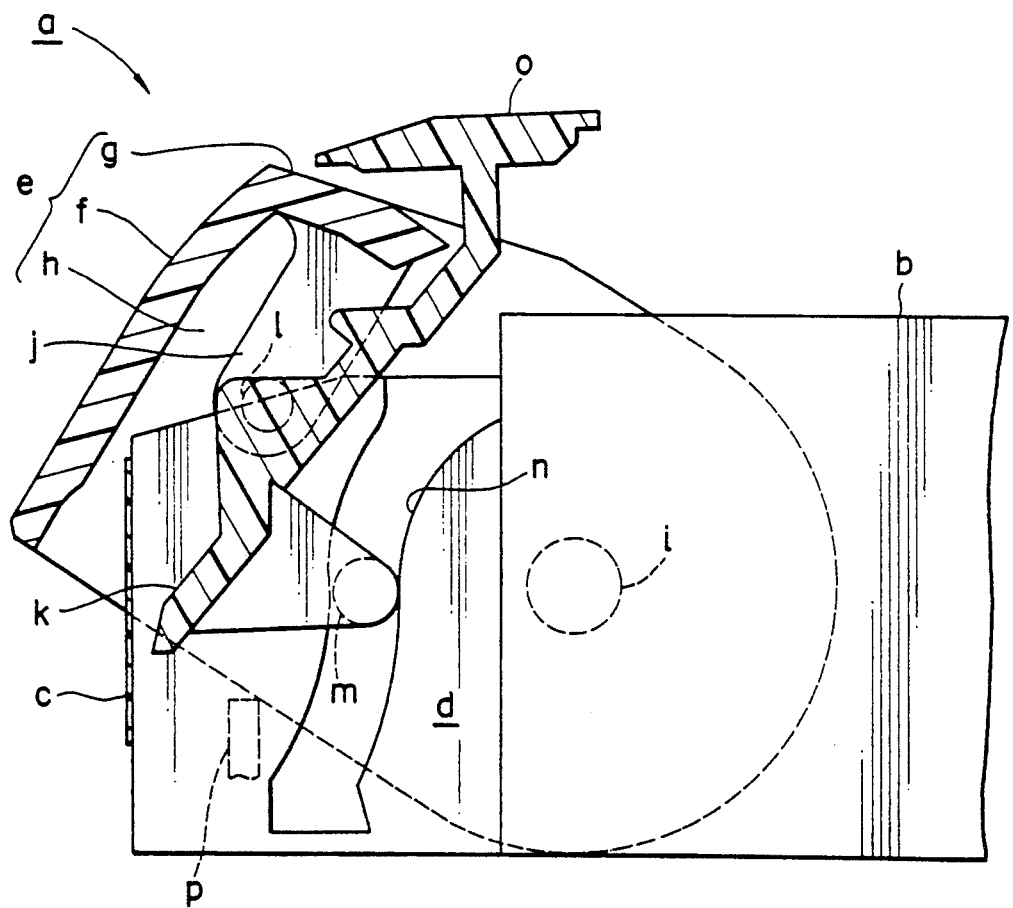
FIG. 11 is a fragmentary sectional view of the prior art tape cassette of FIG. 10 in a state where the tape cassette is half open.
Figure 12:
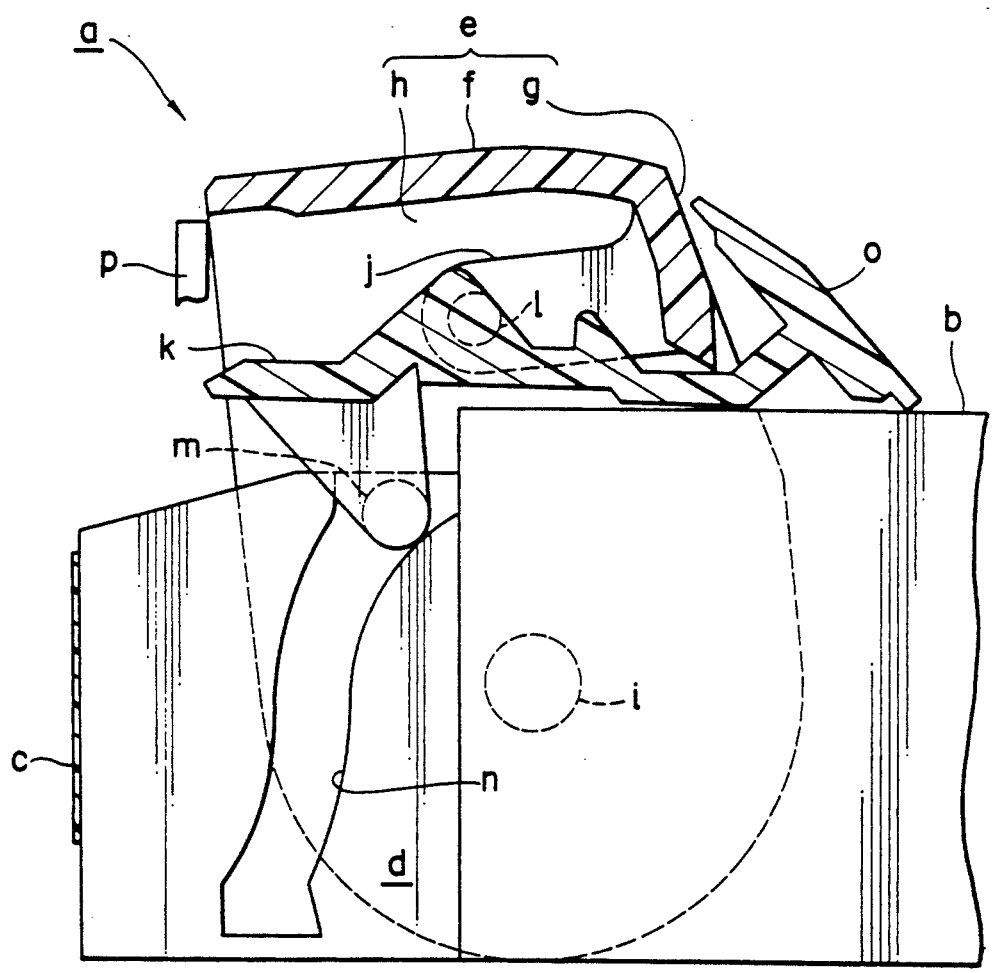
FIG. 12 is a fragmentary sectional view of the prior art tape cassette of FIG. 10 in a state where the tape cassette is fully open.

A lid closing spring 20 is a torsion coil spring as shown in FIG. 9. One end 20a of the lid closing spring 20 rests on the upper surface of the spring peg 11 of the case body 2 and the other end 20b of the same rests on the lower surface of the spring peg 19 of the front lid 13 as shown in FIG. 4 so as to bias the front lid 13 resiliently toward the closing position. The round portion of the lid closing spring 20 surrounds the round projections 17 and 18. When the front lid 13 is at the closing position as shown in FIG. 4, the round projection 17 (17') is pressed resiliently against the rear end 9b (9'b) of the lower guide groove 9 (9'), and the round projection 18 (18') is pressed resiliently against the front end 10a (10'a) of the upper guide groove 10 (10') by the lid closing spring 20 to hold the front lid 13 at the closing position.

Figure 6:
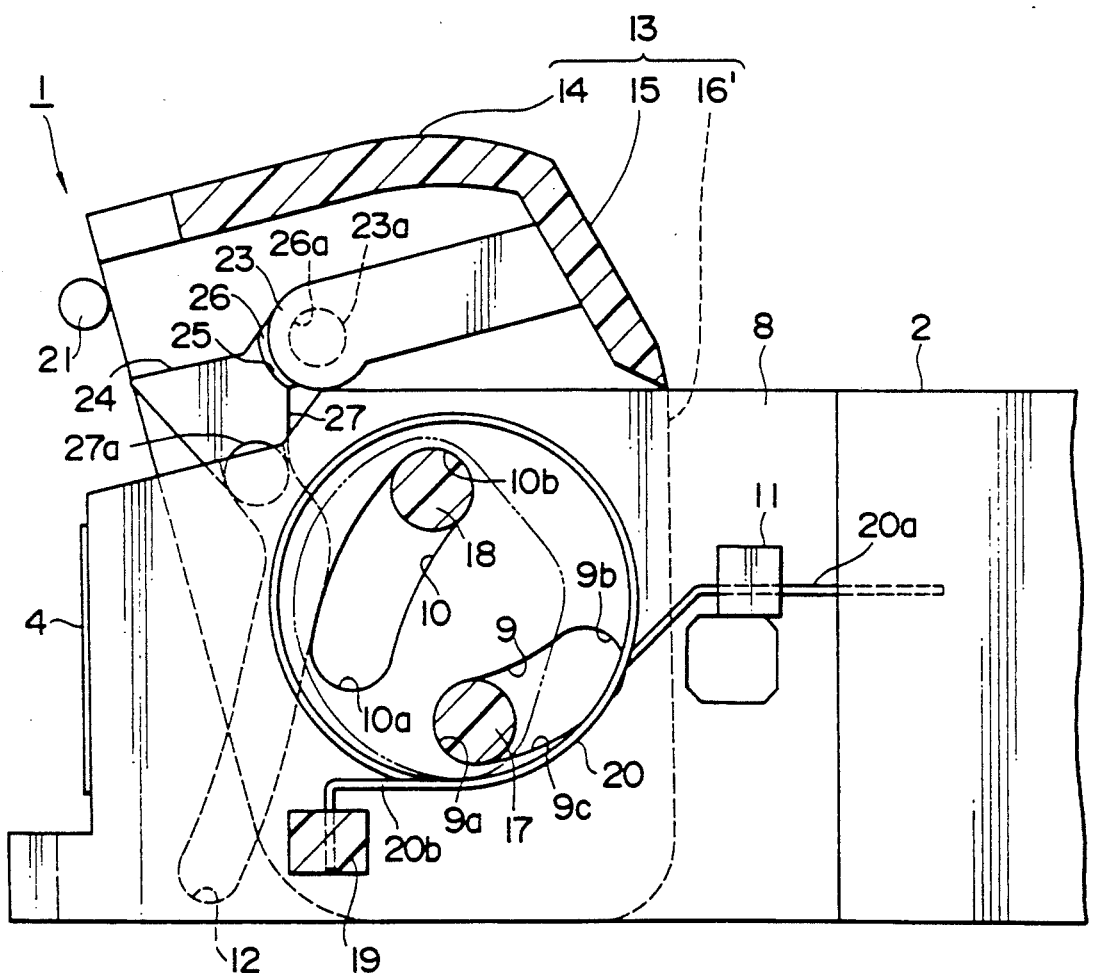
FIG. 6 is a sectional view of the tape cassette of FIG. 1, in a state where the tape cassette is fully open.

Referring to FIGS. 4, 5 and 6, as the tape cassette 1 held on the cassette holder, not shown, of a video tape recorder is lowered toward the cassette loading unit of the video tape recorder, the lid opener 21 of the video tape recorder engages the lower edge of the side wall 16 of the front lid 13 to turn the front lid 13 clockwise relative to the case body 2. Since the round projections 17 and 17' are at the rear ends 9b and 9b' of the lower guide grooves 9 and 9', respectively, and the round projections 18 and 18' are at the front ends 10a and 10'a of the upper guide grooves 10 and 10', respectively, in an initial state where the front lid 13 is at the closing position (FIG. 4), only the round projections 18 and 18' are able to move along the upper guide grooves 10 and 10' in the initial stage of opening the front lid 13. Therefore, the round projections 18 and 18' moves along the upper grooves 10 and 10' toward the rear ends 10b and 10b' of the upper guide grooves 10 and 10' along circular paths having their centers of curvature at the centers of the round projections 17 and 17' positioned at the rear ends 9b and 9b' of the guide grooves 9 and 9', respectively.

Upon the arrival of the round projections 18 and respectively at the rear ends 10b and 10'b of the upper guide grooves 10 and 10' as shown in FIG. 5, the round projections 17 and 17' become able to move respectively along the lower guide grooves 9 and 9'. Then, the round projections 17 and 17' moves toward the front ends 9a and 9'a of the lower guide grooves 9 and 9' along circular paths having their centers of curvature at the centers of the round projections 18 and 18' positioned at the rear ends 10b and 10'b of the upper guide grooves 10, respectively.

In FIG. 6, the front lid 13 is fully opened and positioned at the opening position, and the round projections 17 and 17' are respectively at the front ends 9a and 9'a of the lower guide grooves 9 and 9'. In this state, the lid closing spring 20' urges the front lid 13 counterclockwise as viewed in FIG. 6, the round projections 17 and 17' are able to move respectively along the lower guide grooves 9 and 9', and the round projections 18 and 18' are unable to move along the upper guide grooves 10 and 10'.

As the tape cassette 1 is raised in the cassette loading unit of the video tape recorder, the lid opener 21 moves downward relative to the front lid 13 to allow the front lid 13 to be turned counterclockwise toward the closing position by the lid closing spring 20. In the initial stage of upward movement of the tape cassette, only the projections 17 and 17' move respectively along the lower guide grooves 9 and 9' toward the rear ends 9b and 9b' along circular paths having their centers of curvature at the centers of the round projections 18 and 18' positioned respectively at the rear ends 10b and 10'b of the upper guide grooves 10 and 10'. If the front lid 13 should be twisted by the lid closing spring 20 acting only on one end of the front lid 13, shifting the round projection 18' toward the front end 10'a of the path of the round projection 18' in the initial stage of upward movement of the tape cassette 1, the round projections 17' and 18' are pressed against the respective outer edges of the guide grooves 9' and 10', respectively, and become immovable because path of the round projection 18' is not a circular arc having its center of curvature at the center of an imaginary circle at the rear end 9'b of the lower guide groove 9' and, consequently, the front lid 13 becomes incapable of being turned to the closing position. However, since the lower guide groove 9' is expanded slightly toward the front end 9'a as shown in FIG. 7, the round projection 17' is not pressed against the outer edge of the lower guide groove 9' and hence the front lid 13 can be turned toward the closing position.

Upon the arrival of the round projections 17 and 17' respectively at the rear-ends 9b and 9'b of the lower guide grooves 9 and 9', the round projections 18 and 18' start moving in the upper guide grooves 10 and 10' toward the front end 10a and 10'a of the upper guide grooves 10 and 10' along circular paths having their centers of curvature at the center of the round projections 17 and 17' positioned at the rear ends 9b and 9'b of the lower guide grooves 9 and 9', respectively. The front lid 13 reaches the closing position when the round projections 18 and 18' reach the front ends 10a and 10'a of the upper guide grooves 10 and 10', respectively.

In turning the front lid 13 to the opening position, the front lid 13 turns on the round projections 17 and 17' at the initial stage and turns on the round projections 18 and 18' at the final stage. Therefore, only a relatively small clearance is necessary over the upper surface of the tape cassette 1 for the turning of the front lid 13.

Figure 8:
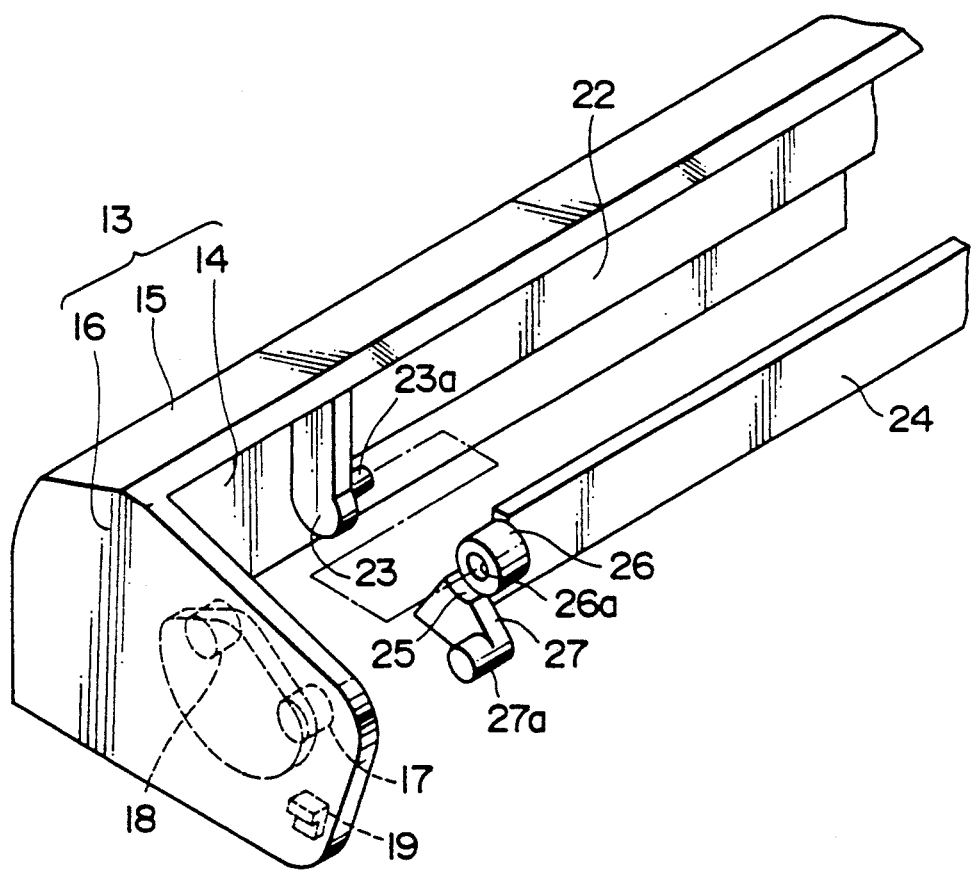
FIG. 8 is an enlarged, exploded perspective view of a front lid and a back lid.

The back wall 22 of the front lid 13 has the shape of a plate and extends from the lower surface of the upper wall 15 in the mouth 7. The length of the back wall 22 is about equal to that of the mouth 7. As best shown in FIG. 8, the back wall 22 is provided integrally with support legs 23 extending backward respectively from the opposite ends thereof, and projections 23a projecting toward each other from lower ends of the the inner surfaces of the support legs 23, respectively. Since the front wall 14, the upper wall 15 and the back wall 22 of the front lid 13 form a channel bar of a substantially U-shaped cross section, the front lid 13 has a relatively high rigidity and does not flex even if it is subjected to a comparatively high pressure.

Referring to FIG. 8, a back lid 24 has the shape of a flat, narrow, elongate plate having a length substantially equal to that of the mouth 7. Recesses 25 are formed in the upper corners of the opposite ends of the back lid 24, respectively, knuckles 26 having bores 26a are formed in the recesses 25, respectively, so as to protrude slightly backward, arms 27 are extended backward from the opposite ends of the back lid 24, respectively, and projections 27a project away from each other from the extremities of the arms 27, respectively.

The projections 23a of the front lid 13 are inserted in the bores 26a of the knuckles 26 of the back lid 24 to combine the front lid 13 and the back lid 24 so that the back lid 24 is able to swing on the projections 23a, and the lower edge of the back wall 22 is substantially in contact with the upper edge of the back lid 24.

When the front lid 13 is at the closing position, the front wall 14 covers a space extending in front of the front surface of the exposed portion, i.e., the portion extending outside the case body 2, of the magnetic tape 4, the back wall 22 covers a space extending behind most part of the back surface of the magnetic tape 4 in the mouth 7, and the lower portion of the back lid 24 is in contact with the back surface of the front wall 14 of the front lid 13 to cover a space extending behind the lower portion of the exposed portion of the magnetic tape 4 and a space extending under the magnetic tape 4 in the mouth 7.

As the front lid 13 is turned toward the opening position, the position of the back lid 24 is controlled by the guide grooves 12 formed in the case body 2 to guide the projections 27a of the back lid 24 so that the back lid 24 will not touch the magnetic tape 4.

Thus, the exposed portion of the magnetic tape 4 is covered completely by the front lid 13 and the back lid 24 when the front lid 13 is at the closing position to protect the exposed portion of the magnetic tape 4 from dusting and the sufficiently rigid front lid 13 protects the magnetic tape 4 from being damaged to enhance the reliability of the tape cassette 1.

Although the invention has been described in its preferred embodiment with a certain degree of particularity, the present embodiment is illustrative and not restrictive, and various changes in the shape, size and arrangement of parts are possible in light of the above teachings. It is therefore to be understood that the present invention may be practiced otherwise than as specifically described herein without departing from the scope and spirit thereof.

What is claimed is:

1. A tape cassette comprising:
a case body having a front wall defining a mouth and provided with tape outlets near the opposite ends of the mouth, and containing tape reels supported for rotation therein and a magnetic tape having opposite ends fastened respectively to the tape reels, wound around the tape reels and extended between the tape reels so that an exposed portion thereof extends along the outer surface of the front wall of the case body between the tape outlets;
a front lid pivotally supported on the case body so as to cover a space extending in front of the exposed portion of the magnetic tape in the mouth; and
a back lid pivotally supported on the front lid so as to cover a space extending behind the substantially lower half of the exposed portion of the magnetic tape in the mouth;
wherein the front lid has a front wall covering the front opening of the mouth, side walls extending backward respectively from the opposite side edges of the front wall, an upper wall covering the upper opening of the mouth, and a back wall extending downward from the upper wall so as to cover a space extending behind the substantially upper half of the exposed portion of the magnetic tape in the mouth,
the lower edge of the back wall of the front lid is substantially in contact with the upper edge of the back lid when the front lid is at the closing position,
each side wall of the front lid is provided with two round projections received respectively in first and second guide grooves formed in the side wall of the case body,
at least one of the first and second guide grooves has the shape of a single arc of a circle,
and the two round projections move successively along the first and second guide grooves, respectively, when the front lid is turned between the closing position and the opening position.

2. A tape cassette according to claim 1, wherein said first guide groove of the two guide grooves has the shape of an arc of a circle having its center at the center of an imaginary circle at one end of the second guide groove.

3. A tape cassette according to claim 2, wherein the second guide groove also has the shape of an arc of a circle having its center at the center of an imaginary circle at one end of the first guide groove.

4. A tape cassette according to claim 3, wherein the center of curvature of each of the guide grooves is at the center of an imaginary circle at the rear end of the other guide groove.

5. A tape cassette according to claim 4, wherein one of the first and second guide grooves has an enlarged section with a width greater than the diameter of the round projection received therein.

6. A tape cassette according to claim 5, wherein the round projection received in the guide groove with said enlarged section moves along said enlarged section at the final stage of turning of the front lid toward the opening position.

7. A tape cassette comprising:
a case body having a side wall and a front wall defining a mouth and provided with tape outlets near the opposite ends of the mouth, and containing tape reels supported for rotation therein and a magnetic tape having opposite ends fastened respectively to the tape reels, wound around the tape reels and extending between the tape reels so that an exposed portion thereof extends along an outer surface of the front wall of the case body between the tape outlets;

a front lid pivotally supported on the case body so as to cover a space extending in front of the exposed portion of the magnetic tape in the mouth; and a back lid pivotally supported on the front lid so as to cover a space extending behind the substantially lower half of the exposed portion of the magnetic tape in the mouth;

wherein the front lid has a front wall cover the front opening of the mouth, side walls extending backward respectively from the opposite side edges of the front wall, an upper wall covering the upper opening of the mouth, and a back wall extending downward from the upper wall so as to cover a space extending behind the substantially upper half of the exposed portion of the magnetic tape in the mouth, the back wall of the front lid having a lower edge substantially in contact with an upper edge of the back lid when the front lid is at the closing position, each side wall of the front lid is provided with two round projections received respectively in two guide grooves formed in the side wall of the case body, wherein each of the two guide grooves has the shape of an arc of a circle having its center at the center of an imaginary circle at one end of the other guide groove and the center of curvature of each of the guide grooves is at the center of an imaginary circle at the rear end of the other guide groove, and the two round projections move successively along the two guide grooves, respectively, when the front lid is turned between the closing position and the opening position.

8. A tape cassette according to claim 7, wherein one of the guide grooves has an enlarged section with a width greater than the diameter of the round projection received therein.

9. A tape cassette according to claim 8, wherein the round projection received in the guide groove with said enlarged section moves along said enlarged section at the final stage of turning of the front lid toward the opening position.

10. A tape cassette comprising:

a case body having a side wall and a front wall defining a mouth and provided with tape outlets near the opposite ends of the mouth, and containing tape reels supported for rotation therein and a magnetic tape having opposite ends fastened respectively to the tape reels, wound around the tape reels and extending between the tape reels so that an exposed portion thereof extends along an outer surface of the front wall of the case body between the tape outlets;

a front lid pivotally supported on the case body so as to cover a space extending in front of the exposed portion of the magnetic tape in the mouth; and a back lid pivotally supported on the front lid so as to cover a space extending behind the substantially lower half of the exposed portion of the magnetic tape in the mouth;

wherein the front lid has a front wall covering the front opening of the mouth, side walls extending backward respectively from the opposite side edges of the front wall, an upper wall covering the upper opening of the mouth, and a back wall extending downward from the upper wall so as to cover a space extending behind the substantially upper half of the exposed portion of the magnetic tape in the mouth, the back wall of the front lid having a lower edge substantially in contact with an upper edge of the back lid when the front lid is at the closing position, each side wall of the front lid is provided with two round projections received respectively in first and second guide grooves formed in the side wall of the case body, each of the first and second guide grooves having the shape of an arc wherein the center of curvature of each of the guide grooves is at the center of an imaginary circle at one end of the other guide groove, and the two round projections move successively along the first and second guide grooves, respectively, when the front lid is turned between the closing position and the opening position.

* * * * *